March 18, 1969     A. C. PETERSON     3,433,317
VARIABLE SYSTEMS OF PROPULSION FOR AUTOMOBILES
Filed Sept. 26, 1966     Sheet 1 of 2
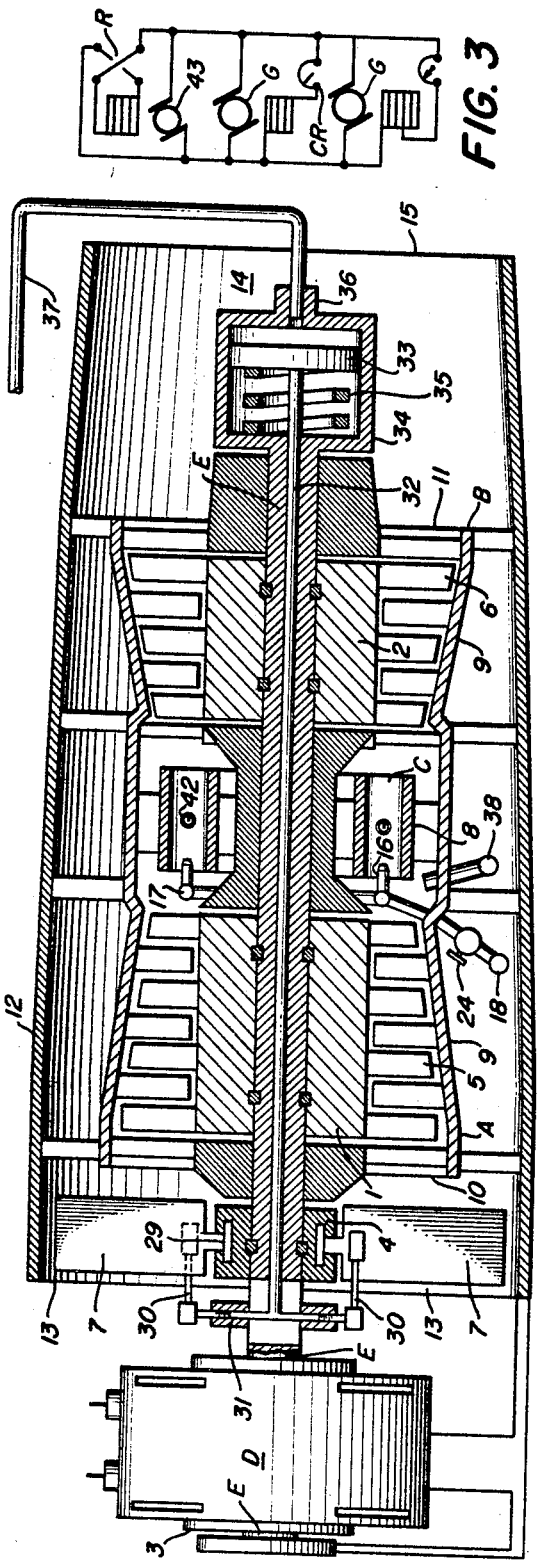
INVENTOR.
ADOLPHE C. PETERSON

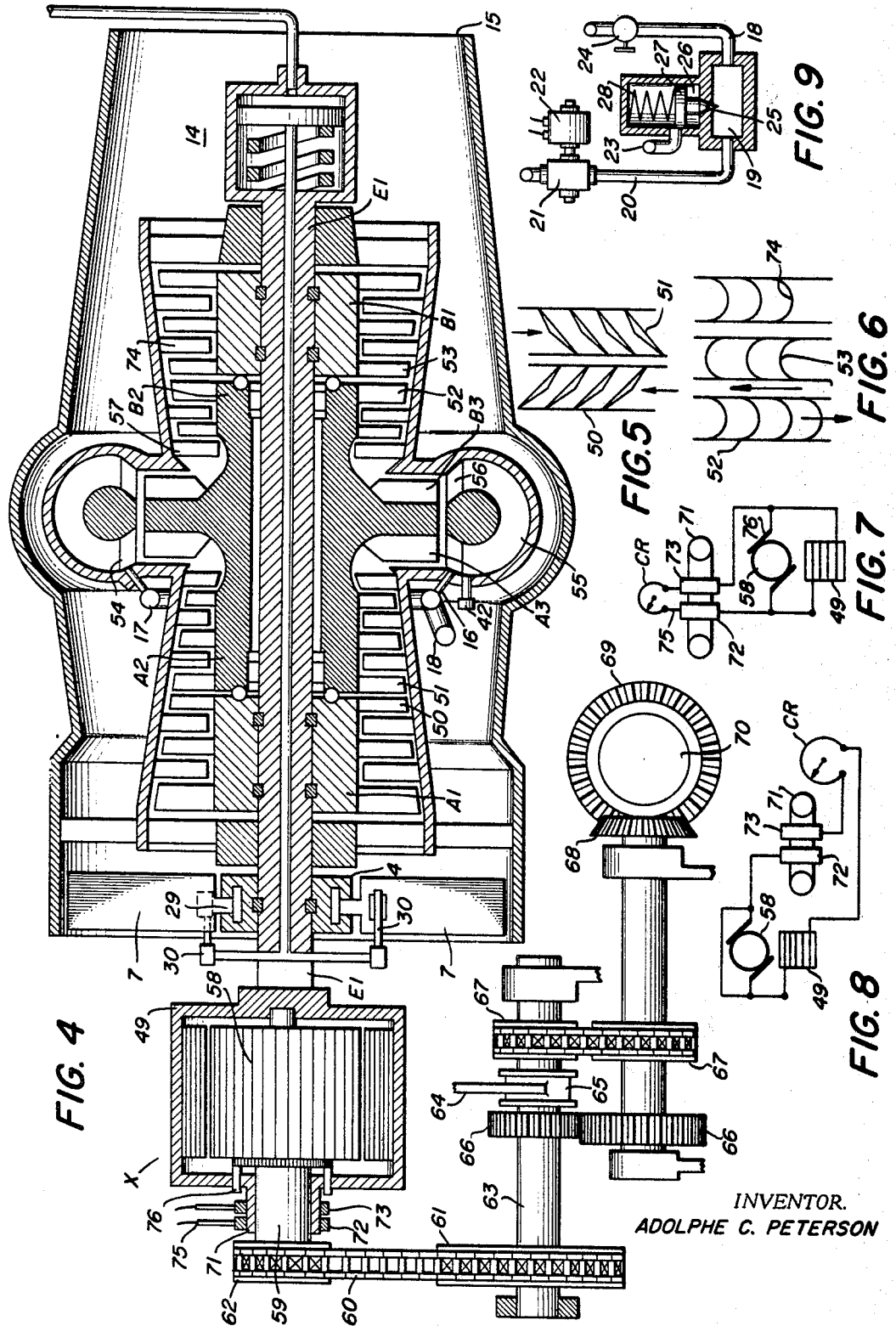

United States Patent Office 3,433,317
Patented Mar. 18, 1969

3,433,317
**VARIABLE SYSTEMS OF PROPULSION
FOR AUTOMOBILES**
Adolphe C. Peterson, 4623 Bruce Ave. S.,
Minneapolis, Minn. 55424
Filed Sept. 26, 1966, Ser. No. 581,868
U.S. Cl. 180—7          14 Claims
Int. Cl. B62d 57/04

ABSTRACT OF THE DISCLOSURE

Propulsion systems for automobiles wherein the primary power producing means is a gas turbine means, which is arranged to produce propulsion power for an automobile through several means, one of which is electro-magnetic transmission means and another of which is impulsive jet thrust type means. The electro-magnetic transmission means may be either of two types, one of which includes generation means and motor means and the other of which is by a single unit electro-magnetic drive.

---

My invention relates to automotive vehicle propulsion and especially to a system which employs variably propelling means and it is therefore called variable systems of propulsion for automobiles.

A chief reason and object for this invention is to provide a system of propulsion for automobiles of the higher speed type such as automobiles for free-way travel and for speedway travel, which means shall in general be of a comparatively simple construction and more effective in the usual high speed travel on freeways, and which shall at the same time be more durable in its mechanism for such high speed travel. An object is to provide a system of propulsion which, because of its manner of application of power to propulsion, is more economical of fuel at high speed travel, and especially long distance travel, and this results from the fact that the application is in toto from the application of power by more direct propulsive thrust, and also by reason of the fact that the engine may be somewhat smaller size or maximum power, due to the method of application of the power, and thus because of the fact that the propulsion means may be designed to be economical of fuel at the usual cruising or travel speeds.

A more important reason also is that there has lately become available for power uses at the capacities which are necessary for automobiles of the passenger type, especially, the much lighter weight gas turbine. This gas turbine engine means is, as now available, of a very high rotative speed in its power output means, and this character of its power output provides a better means for the application of power directly to thrust on the ambient air in travel, and his ability makes possible the application of propulsive power without the full dependence upon road wheel driving power. The use of road wheel driving power is usually necessary because automobiles must travel much of the time at speeds less than the speed of freeway travel, and because of the fact that other means of propulsion is also necessary in the commonly used vehicles, because of the necessity of travel of automobiles in communities and highways where there is also pedestrian travel.

An object is the improvement of the application of gas turbine power to the propulsion of automobiles, it being important to provide such improved application of the power of gas turbines, for the reason that by this improvement in such application, the power can be applied for propulsion with more economical use of fuel, and with more economy in construction of the means, and with more economy in the maintenance of the automotive transmission of power means for such road wheel driving as is necessary.

The principal devices and combinations of devices comprising my invention, are as hereinafter described and as defined in the claims appended to the description. In the accompanying drawings which illustrate my invention in two general forms, like characters refer to like parts throughout the several views, in so far as is practicable.

Referring to the drawings, FIGURES 1, 2, 3 show one form of my device and of these figures;

FIGURE 1 is a view in vertical cross section through the axes of the chief power elements, this view showing some elements in full side elevation and some broken away, the cross section being on the line 1—1 of FIGURE 2, two of the units such as shown in FIGURE 1 being shown in FIGURE 2 in much reduced scale.

FIGURE 2 is a plan view of an automobile of the passenger vehicle type, this view showing in much reduced scale, two such chief power units, such as the one shown in FIGURE 1, and showing also the manner of application of valve control means to the two units, and showing also the supplemental motor drive means.

FIGURE 3 is a diagrammatic illustration of the circuit and control means for the electric power transmission means.

FIGURES 4, 5, 6, 7 and 8 are views of a modified form of the device, and of these views, FIGURE 4 is a vertical cross section through the axes of the chief components of the device; FIGURE 5 is a diagrammatic view showing the relative incidence relation of adjoining blade stages of the primary and secondary compressor units; FIGURE 6 is also a diagrammatic view showing the incidence relation of blade stages of adjoining elements of the primary and secondary turbine rotor means; FIGURE 7 shows diagrammatically one form of control for the magnetic clutch means of this modified form; FIGURE 8 shows another form of control for that magnetic clutch means; FIGURE 9 is chiefly a cross section through one of the valve means and with it in elevation some of the other elements of the fuel supply means for the combustion process. This fuel supply means may be used for either form of the invention, or any other such means may be used.

The form of the invention which is shown in FIGURES 1, 2 and 3, is now described. Referring chiefly to FIGURE 1, there are here illustrated component units; air compressor A, turbine unit B, combustion chamber unit C, electric generator D; there being a single rotatable shaft E by which the rotor units, are connected for rotation as integrated means, these rotor units being namely, compressor rotor 1, turbine rotor 2, generator armature 3, air-fan or by-pass rotor 4. The compressor rotor has compressor blades 5, the turbine has turbine blades 6, the air-fan or by-pass rotor has air fan blades 7, the generator armature 3 is made as such generator means are usually made or in any manner as commonly known to be efficient for generation of electric current, for the use as hereinafter described.

The combustion chamber unit C is made by two annular chamber walls 8 one internally within the other to form combustion space therebetween. The casing 9 encloses the compressor and turbine and combustion chamber unit and has air intake 10 at one end and gas discharge 11 at the opposite end where gases are discharged. The exterior casing 12, of considerably larger diameter than the casing 9 is externally of the casing 9 and all the rotor means and forms a comparatively large by-pass tunnel in which the air-fan rotor with its air fan blades 7 rotates and propels air from the air intake 13 of comparatively large diameter and propels the air through the tunnel, which is designated 14, and from the tunnel discharge designated 15, some of the air at the front end being diverted into the turbine air intake 10, the gases of the turbine being discharged at 11 and therefrom into the by-pass air in the discharge end of the tunnel 14, mixing with the air there and passing therewith into ambient air atmosphere behind the automobile of which the apparatus is a part.

The combustion chamber unit is supplied with fuel such as gasoline or kerosene or other fuel of combustible nature by means of the fuel nozzles 16, the annular fuel supply pipe 17, and the supply pipe 18. The latter pipe is broken away in FIGURE 1, but shown as the same pipe 18 in FIGURE 9, where the chamber 19 is a fuel pressure chamber, pipe 20 the fuel pump discharge to chamber 19, 21 is the fuel pump operated by electric motor 22, 23 is by-pass fuel return to the fuel supply tank (not shown), 24 is the fuel throttle valve by which fuel flow to the fuel nozzles 16 is regulated in quantity flowing or shut off entirely, 25 is a needle valve automatically opening or closing a port from chamber 19 to chamber 26 and thereby to return through fuel return pipe 23 to the supply tank (not shown), the needle valve having pressure responsive piston 27 attached and yieldably seated by spring 28. Thus fuel pressure is continuously maintained at the high pressure as may be required, quantity of flow per unit of time being regulated by throttle valve 24.

The air fan rotor 4 mounts a number of the air fan blades 7 by their radially inward mounting shafts or axles 29, each having as shown a flange on its innermost end which, being inwardly of the air fan rotor, retains the attached air fan blade against centrifugal force. Each air fan blade 7 has a crank arm fixed with the air fan blade and this by connecting links 30 (one for each) is flexibly or oscillatively mounted on radial rods or short axis shafts which are fixed in collar 31 which is mounted on and slidable axially on the shaft E adjacent to the air fan rotor 4 so that, by axial rod 32 which is axially slidable in shaft E in a bore therein, the collar 31 and with it the links 30 and connected cranks and air fan blades 7 are moved to turn or oscillate the air fan blades on their axis mountings in the air fan rotor 4, to thereby enable the pilot or driver of a vehicle to increase the impact incidence of the air fan blades 7 for forwardly impelling vehicle thrust or to alternatively reverse the movement to diminish the incidence angle to zero, if desired, or to then increase the angle of incidence of the air fan blades for the reverse impelling incidence, so that in this reversing condition the air fan blades may create air flow reversely in the air tunnel 14, to thereby apply braking impulsion on the vehicle and additionally to apply propelling impulsion on the vehicle to move the vehicle for reverse or backward, that is, rearward travel, as may be necessary for a short distance.

The axial rod 32 at its rearward end is attached to a small control element or piston 33, the lattter being slidable in a small control cylinder 34 which is formed on or attached at the extreme rear end of the shaft E, to be rotatable with shaft E, the control element 33 being movable in one direction by spring 35 and being movable in the opposite direction by pressure of air (or gases) in the cylinder 34 on the extreme rear side of control element 33 to move control axial rod 32 forwardly in shaft E to increase incidence angle for forward propulsioned travel. Movement in the opposite direction of the axial rod 32 by spring 35 will cause reversal of incidence to provide braking or reverse travel impulsion, The control cylinder 34 has a bearing 36 on a fluid pressure pipe 37 supplying fluid under pressure, gaseous or liquid (as may be provided for control).

The fluid pressure pipe 37 is shown as being connected by a pipe 38 to the turbine casing 9 and receiving air or gaseous fluid under pressure from the air flowing between the compressor and turbine rotor and there is intercepting this flow a gas reservoir 39, throttle valve 40, whereby flow may be permitted by the throttle valve to the pipe 37 and control cylinder 34 and blocked from flow through discharge pipe 41 to atmosphere, or alternatively flow may be permitted from the control cylinder 34 and pipe 37 to atmosphere and blocked from flow away from the reservoir 39 and pipe 38. Any other means of supply of fluid under pressure, either gaseous or liquid may be provided.

Spark plugs or other iginition means 42 is provided in the combustion chamber unit. The electric generator D by the rotation of its armature 3 with shaft E provides electric current proportionately to rotation of shaft E by the turbine and the current supplied may be either direct or alternating current and the current is supplied for an electric motor 43 which is of any suitable type as commonly known, any from of control means as may be necessary and any form of electric current conversion means, as may be necessary being provided. The electric motor 43 by its shaft 44 and differential and bevel gears in casing 45 (in any manner) as commonly used drives shafts 46 and road wheels 47 (either front, as shown, or rear wheels) for forward or rearward propulsion of the vehicle. FIGURE 3 shows diagrammatically and only as necessary to illustrate a control means circuit for control of the electric motor as it is to be driven by current from the electric generator D, and in this diagram circuit, 43 designates the motor G designates the two electric generators as provided by two units as shown in FIGURE 1, FIGURE 2 showing two such units each designated as PU, this emblem meaning "propulsion unit." In the diagram, FIGURE 3, R designates the reversing control for the motor 43 and CR designates the rheostate control for the generators G. Such control means is, as illustrated, contemplated only to designate any control means for control between generators and motor.

Having described in detail the components comprising my invention in the first form as illustrated in FIGURES 1, 2 and 3, the operation of this form of the device is now generally described. FIGURE 2 illustrates the location of the two propulsion units, each of which is such as the one unit which is specifically shown in FIGURE 1. There are preferably two of such units on a passenger automobile vehicle, these being stationed at the rear end of the vehicle, and so associated with the vehicle body that there are large air flowing spaces 48 formed at the sides of the vehicle body so that ambient air may, in motion of the vehicle, easily flow through or by these spaces 48 to the air intakes 13 (of each units) to the air tunnel of the propulsion unit PU. The discharge from the units PU at the extreme rear of the units must be direct to atmosphere rearwardly of the vehicle and unimpeded in any way.

To prepare the vehicle for propulsion, the driver of the vehicle starts the shaft E of each propulsion unit in rotation in any way as gas turbines are usually started, and may be by use of the electric generators D as motors, temporarily, or by any electric starting motors as may be provided, such means being commonly used in gas turbines for starting. The fuel pump 21 is started in operation by its motor 22 and thereupon pressure accumulates in the fuel reservoir 19 and the operator or driver may then open the hand throttle valve 24 (FIGS. 1 and 9), and supply current as commonly done to the ignition means 42. Thereupon the gas turbine takes up its process of combustion as in gas turbines by compression of air, fuel supply and combustion and flow through the blade structure of the gas turbine. For this starting the blades of the air fan may be placed in the neutral position or reversing position, and in the latter case the fuel supply may be still merely sufficient for idling speed of the shaft E. The operator may now place the generator control rheostats in the position for sufficient current generation, and also may place the motor reverse control R in place or condition for sufficient power generation by motor 43 (M in diagram) and the vehicle may then travel at starting or slow speed. The operator may in starting, if desirable and necessary, place the air fan blades 7 in the incidence for forward propulsion by the air fan propulsion means, and he will do this at least as soon as speed has accelerated some, and in that condition of the air fan blades the gas turbine will be operating at high speed as in turbines and the air fan will then propel a large flow of air through the air tunnel or by-pass flow passage of each PU unit and this will result in large propulsion thrust from the air tunnel and upon the vehicle for travel propulsion forwardly. The vehicle will now operate with two systems of propulsion, the air thrust propulsion by the two units PU and the propulsion by the motor 43 through the road wheels 47 of the vehicle. The operator may, as he finds necessary or most desirable, vary the propulsion by motor 43 through control of the electric generation by means of the control rheostats CR (FIG. 9). By control of the fuel supply to the gas turbines by the throttle valves 24 the power output by either of the power propulsion means may be altered as necessary to suit the conditions of travel as may be desired. When braking is desired the operator may apply the brakes as usually used in such vehicles on the road wheels, and he may also by means of the hand valve 40 (FIG. 2) release fluid pressure from the control cylinders 34 of the two units PU and thereupon the air fan blades take the position for reverse flow of air through the air tunnels or by-passes and this creates thrust in the oppositely acting, that is forward direction, to thereby provide braking thrust to aid in stopping the vehicle. The operator may continue this reverse thrust from the air tunnels to use such thrust for reverse travel of the vehicle for short distances.

Referring now to the modified form of my device which is illustrated in FIGURES 4, 5, 6, 7 and 8, there are several important differences in this modified form as compared with the form shown in FIGURES 1, 2 and 3. One important difference is in the gas turbine and this difference is in the construction and operation of the gas turbine itself, which in this form has two oppositely rotating units. One such rotating unit is comprised of compressor motor A1, turbine unit B1, and shaft E1 by which A1 and B1 are united in rotation and are also by shaft E1 united in rotation with one component 49 which is a field element of an electro-magnetic clutch which is generally designated X. The other rotating unit of the gas turbine is comprised of compressor rotor A2, axial flow turbine rotor B2, centrifugal compressor A3, radial inflow turbine B3, and these units of which this second rotating unit is comprised are all integrally united for rotation as one unit, and this independently rotating unit rotates in a rotational direction which is opposite, that is contra, to the rotation of the first described rotating unit. The result of this contra rotation is that the third stage of blades of compressor rotor A1, these blades or stage being designated 50, rotate in the direction as shown in FIGURE 5 and the first stage of compressor blades on compressor rotor A2 move in opposite directions, as shown in FIGURE 5, and the blades of compressor rotor A1 discharge directly to the first stage 51 compressor blades of compressor rotor A2. Likewise the last stage of turbine blades (designated 52) of the turbine rotor B2 discharge directly to the first stage of turbine blades (designated 53) of turbine rotor B1, these named stages operating rotationally in opposite directions.

The centrifugal compressor A3 delivers radially outwardly between the static circumferential guides 54 to combustion chamber 55 which is annularly of the centrifugal compressor rotor, and this combustion chamber delivers gases of combustion by the annular static guide blades 56 into the circumference space occupied by the radially inflow turbine B3 and the gases after performing work thereby flow by static guides 57 to the first stage of the axial flow turbine blades of the turbine rotor B2, and the gases flow from the last stage of blades of turbine rotor B2 directly to the first stage of axial flow blades of the turbine rotor B1 and are from that last turbine rotor discharged to the flow of air issuing through the air tunnel or by-pass tunnel 14 wherein air flows rearwardly from the air fan 7, this air fan being similar to that of the first form described and propelling air from ambient air through the air tunnel 14 to the tunnel discharge at 15. The air fan is controlled for angle of incidence as in the first described form.

The field element 49 of the electro-magnetic clutch means X is circumferentially of an armature element 58. There is no mechanical connection with the field element 49 or the shaft E1, so that each rotates mechanically independently of the other, although the field element by its electro-magnetic effect operates to transmit magnetic torque and thereby driving impulse to the armature element 58 and thereby to the driving shaft 59 and the chain drive 60 to the sprocket wheel 61, the chain being driven by the sprocket wheel 62 on the driving shaft 59, the latter being rotatively fixed with the armature element 58. The sprocket wheel 61 is on shaft 63 which according to control rod 64 and double ended clutch 65 may transmit drive either by pair of spur gears 66 or sprocket wheels and chain 67 to the bevel gear 68 and thereby to larger bevel gear 69 and its included differential unit 70 which is the road wheel driving unit as in automotive equipment as generally used.

The control for the electro-magnetic clutch units is as shown in FIGURE 7 or alternatively as in FIGURE 8, either of which may be used. In FIGURES 7 and 8 there is diagrammatically shown the short cylindrical tubular shaft 71 (FIGURE 4) which is about shaft 59 (FIG. 4) being rotatable thereon, and the shaft 71 which is attached with the field unit 49 bears rings contacts 72, 73, and the latter are in the circuit with the armature element 58 so that as in FIGURE 7 the control rheostat CR provides for control of flow through the armature element 58 or alternatively as in FIGURE 8 the control rheostat CR provides control of flow through the field 49. Either of these methods of control of flow of electric current may be used in any construction whereby the strength of the magnetic torque relation in the means X may be varied as may be necessary for transmission of driving power from the gas turbine unit to the road wheels which are shown as 47 in FIGURE 2. The form of the device as shown in FIGURE 4 would be mounted as a single turbine power unit on a vehicle, the unit being centrally of the rear part of the vehicle and driving as shown in FIGURE 4 to road wheels (not shown in FIG. 4) by means of the differential unit as shown in FIG. 4.

The contra rotation of the turbine rotor means in this modified form (FIGURE 4) is diagrammatically shown in FIGURE 6 wherein turbine blades 52 are shown as moving one way and turbine blades 53 as moving the opposite direction, these blades being respectively of turbine rotor B2 and B1, and the succeeding stator blades are shown as 74 the latter being static.

The fuel nozzles 16 delivering to combustion chamber 55 are supplied with fuel by supply pipe 18 and the means as illustrated in FIGURE 9. The control of the angles of incidence of the air fan blades 7 is by means of the same elements as shown in FIGURE 1, whereby the movement of air through the air tunnel 14 and the thrust created is controlled as described in connection with FIGURE 1. Commutator or contact ring brushes 75, which are static, are formed as a part of the control circuits which have been described. Commutator brushes 76 move with element 49.

It may be noted that any type of indicating means may be used in connection with the air fan blades 7 and the means changing their angles of incidence, such indicating means being well known as means to indicate degree of movement of any movable means. While there are visible in FIGURES 1 and 4 only two of the air fan blades, it is contemplated that there are preferably a considerable number of such blades attached with the air fan hub 4, each to be movable for change of angle of incidence, and that such number may be as many as are necessary to substantially occupy the space within the casing 12 and circumferentially of the air fan hub 4, and this number may be as many as twenty to forty, or even more or less, and the means to change angles of incidence will be associated with all such air fan blades of a unit and movable for such change coincidently as required. Such air fan units should be so constructed to have such a number of blades and such lateral width of each blade as will result in the most efficient intake of atmospheric air and impulsion of the air through the air fan tunnel 14. It is contemplated that either of the forms of electro-magnetic transmission may be used with either of the forms of gas turbine power means as illustrated or any form of turbine having the air tunnel associated and air fan means within the tunnel for creation of thrust propulsion by the air fan means, and tunnel with air discharge therefrom.

While I have shown particular devices and combinations of devices in the illustration of my invention, it is contemplated that other detailed devices and combinations of devices may be utilized in the realization of my invention without departing from the spirit and contemplation thereof. The terms "gas turbine rotor means" and "turbine rotor means" used in claims are contemplated to include such elements such as blades or other impulse means as may be deemed necessary in construction so that such means may adequately perform its function.

What I claim is:

1. In vehicle propulsion means: a road wheel means by which the vehicle is supported on a roadway; a power generation means comprising air intake means, air compression means, gas turbine rotor means, combustor intermediately of flow from the air compressor means to the turbine rotor means, means supplying fuel flow to the combustor means; a supplementary air conduit means and air intake means thereto and impulsive air flow therefrom by air discharge means, air propulsion means driven by the turbine rotor means to propel air from the air intake means through the air conduit means and from the air discharge means for effective thrust for vehicle propulsion; electro-magnetic torque transmitting means having an element mechanically in connection with the turbine rotor means to receive therefrom driving impulsion and having another element mechanically in connection with at least part of the road wheel means for transmission of driving impulsion thereto.

2. In vehicle propulsion means: a road wheel means by which the vehicle is supported on a roadway; a power generation means comprising air intake means, air compression means, gas turbine rotor means, combustor means intermediately of flow from the air compressor means to the turbine rotor means, means supplying fuel to the combustor means; a supplementary air conduit means and air intake means thereto and impulsive air flow therefrom by air discharge means, air propulsion means driven by the turbine rotor means to propel air from the air intake means through the air conduit means and from the air discharge means for effective thrust for vehicle propulsion; an electric generating means having driving transmission thereto from the gas turbine rotor means; an electric motor means having driving transmission from it to at least part of the road wheel means; means for control of the work energy output from the gas turbine rotor means; means for control of flow of electric current from said electric generating means to said electric motor means.

3. In vehicle propulsion means: a road wheel means by which the vehicle is supported on a roadway; an air channel means having air intake means and air discharge means and conduit means therebetween for flow of air therebetween; air displacement means operative rotationally in the air channel means to impel air flow therein and therefrom; turbine rotor means and driving transmission therefrom to the air displacement means to procure its rotation and air impulsion thereby; means in connection with the turbine rotor means to provide gaseous fluid flow to the turbine rotor means to procure its rotation and transmission of work energy therefrom to the air displacement means; electro-magnetic torque transmission means having an element mechanically in connection with the turbine rotor means to receive therefrom driving impulsion and having another element mechanically in connection with at least part of the road wheel means for transmission of driving impulsion thereto.

4. In vehicle propulsion means: a road wheel means by which the vehicle is supported on a roadway; an air channel means having air intake means and air discharge means and conduit means therebetween for flow of air therebetween; air displacement means operative rotationally in the air channel means to impel flow therein and therefrom; turbine rotor means and driving transmission therefrom to the air displacement means to procure its rotation and air impulsion thereby; means in connection with the turbine rotor means for air intake and compression and combustion of fuel therewith and impact of gaseous flow upon the turbine rotor means to procure its rotation and transmission of work energy therefrom to the air displacement means for its rotation; electromagnetic torque transmission means having an element mechanically in connection with the turbine rotor means to receive therefrom driving impulsion and having another element mechanically in connection with at least part of the road wheel means for transmission of driving impulsion thereto.

5. The means as defined in claim 1 and: the air propulsion means being further defined as comprised of a driven hub means having mounted thereon for rotation therewith a blade means, the blade means being adjustable for change in its impact on air in said supplementary air conduit means for variation in the propulsion thrust thereby.

6. The means as defined in claim 2 and: the air propulsion means being further defined as comprising driven hub means having mounted thereon for rotation therewith a blade means the blade means being adjustable for change in the impact on air in said supplementary air conduit means for variation in the propulsion thrust thereby.

7. The means as defined in claim 3 and: the air propulsion means being further defined as comprised of a driven hub means having mounted thereon for rotation therewith a blade means the blade means being adjustable for change in its impact on air in said air channel means for variation in the propulsion thrust thereby.

8. The means as defined in claim 4 and: the air displacement means being further defined as comprised of a driven hub means having mounted thereon for rotation therewith a blade means the blade means being adjustable for change in its impact on air in said air channel means for variation in the propulsion thrust thereby.

9. The means as defined in claim 3 and: means for change of the turbine work energy absorption by said electro-magnetic torque transmission means.

10. The means as defined in claim 3 and: means for variation of the work energy production by said turbine rotor means by change in its combustion.

11. The means as defined in claim 4 and: means for variation of the work energy production by said turbine rotor means by change in its combustion.

12. The means as defined in claim 1 and: the said elements of said electro-magnetic torque transmitting means being in magnetic association each with the other for transmission of driving torque.

13. The means as defined in claim 1 and: the first named element of said electro-magnetic torque transmitting means being in association with an electro-magnetic field means to produce electric current flow to the second named element of said electro-magnetic torque transmitting means to produce kinetic work energy and means providing current flow between said means of said electro-magnetic torque transmitting means.

14. Means as in claim 1 and: the air compressor means having primary and secondary rotors, the gas turbine rotor means having primary and secondary rotors, one compressor rotor joined with one turbine rotor to rotate together independently of the others.

References Cited

UNITED STATES PATENTS

| 2,758,661 | 8/1956 | Peterson | 180—7 |
| 3,191,707 | 6/1965 | Peterson | 180—7 |

LEO FRIAGLIA, *Primary Examiner.*